(12) United States Patent
Ishida et al.

(10) Patent No.: US 7,270,875 B2
(45) Date of Patent: Sep. 18, 2007

(54) GLAND PACKING

(75) Inventors: Makoto Ishida, Gojo (JP); Kazumasa Takiteru, Gojo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 142 days.

(21) Appl. No.: 10/535,596

(22) PCT Filed: Nov. 20, 2003

(86) PCT No.: PCT/JP03/14817

§ 371 (c)(1), (2), (4) Date: May 19, 2005

(87) PCT Pub. No.: WO2004/046590

PCT Pub. Date: Jun. 3, 2004

(65) Prior Publication Data

US 2006/0012126 A1   Jan. 19, 2006

(30) Foreign Application Priority Data

Nov. 20, 2002  (JP) .............................. 2002-336817

(51) Int. Cl.
*B32B 5/16* (2006.01)
(52) U.S. Cl. ...................... 428/324; 277/342; 277/349; 277/537; 277/538
(58) Field of Classification Search ................. 428/324
See application file for complete search history.

(56) References Cited

U.S. PATENT DOCUMENTS

| 4,256,806 A * | 3/1981 | Snyder ...................... 428/378 |
| 4,477,094 A * | 10/1984 | Yamamoto et al. ......... 277/592 |
| 5,240,769 A * | 8/1993 | Ueda et al. ................. 428/365 |
| 5,437,767 A * | 8/1995 | Halout et al. ............... 162/145 |
| 5,472,995 A * | 12/1995 | Kaminski et al. ........... 523/155 |
| 5,536,565 A * | 7/1996 | Halout et al. ............... 442/417 |
| 6,020,276 A * | 2/2000 | Hoyes et al. ............... 442/185 |
| 6,296,907 B1 * | 10/2001 | Viksne ....................... 427/387 |
| 7,011,312 B2 * | 3/2006 | Ishida ........................ 277/342 |
| 2004/0048137 A1* | 3/2004 | Chou et al. .................. 429/35 |
| 2006/0012126 A1* | 1/2006 | Ishida et al. ................ 277/510 |

FOREIGN PATENT DOCUMENTS

| CN | 86 1 02711 A | 3/1986 |
| GB | 2 172 883 A | 10/1986 |
| JP | 57-103974 A | 6/1982 |
| JP | 60-252872 A | 12/1985 |
| JP | 6-249345 A | 9/1994 |

* cited by examiner

*Primary Examiner*—Carol Chaney
*Assistant Examiner*—Gary Harris
(74) *Attorney, Agent, or Firm*—The Webb Law Firm

(57) ABSTRACT

A gland packing characterized in that a water swelling mineral is stuck or impregnated into a surface or an inner part of a gland packing base material. The water swelling mineral is preferably water swelling mica. This gland packing substantially eliminates seizing and can exhibit an excellent sealing property even if the amount of leakage of an internal fluid or injected fluid for lubrication on a sliding surface is lessened as compared with a conventional example.

2 Claims, No Drawings

GLAND PACKING

FIELD OF THE INVENTION

The present invention relates to a gland packing, and more particularly to a gland packing used for sealing the shaft portion of a rotating and reciprocating apparatus such as a pump.

BACKGROUND OF THE INVENTION

An excellent sealing property has been required for a gland packing used for sealing the shaft portion of a rotating and reciprocating apparatus such as a pump.

In the rotating and reciprocating apparatus, the contact portion of the shaft and the gland packing slides when the shaft is operated, and the lubricating property of a contact surface has to be maintained. The maintenance of the lubricating property is insufficient with only a lubricating oil or the like which is impregnated into the gland packing. By usually regulating the fastening pressure of the fastening bolt of a stuffing box, therefore, an internal fluid or an injected liquid is caused to properly leak onto the contact surface of the shaft and the gland packing to put the liquid on the contact surface, thereby maintaining the lubricating property.

In consideration of a sealing property, it is preferable that the amount of leakage should be lessened. If the amount of leakage is too small, however, the attaching portion of the gland packing generates heat so that a frictional force is increased rapidly.

In the case in which the frictional force of the gland packing and the shaft is greater than the power of the apparatus, the operation of the shaft is stopped.

In the case in which the power of the apparatus is greater than the frictional force, there occurs a phenomenon in which the gland packing causes an abnormal friction by the frictional force or a viscosity of the lubricating oil impregnated in the gland packing is reduced due to the generation of heat so that a large amount of lubricating oil flows out, resulting in an abnormal increase in the amount of leakage. (In the present invention, these phenomena will be referred to as "seizing")

Accordingly, there has been required a gland packing for a rotating and reciprocating apparatus hardly causing the seizing in a small amount of leakage and having an excellent sealing property.

For the prior art of the gland packing for a rotating and reciprocating apparatus, there has been known a gland packing obtained by braiding asbestos, a carbon fiber, an inorganic fiber, an organic fiber or the like and using fluororesin particulates, various waxes, a solid lubricant such as graphite or mica, and furthermore, an oil content having a low viscosity as an impregnant (an impregnant material).

In the case in which a gland packing using an oil type lubricating oil, a fluororesin or the like is utilized for a water type fluid seal, there occurs a problem in that a uniform lubricating film is formed on a contact surface with difficulty due to a water repellency and the amount of leakage has to be increased in order to maintain the lubricating property.

Japanese Patent Laid-Open Publication No. 57-103974 has disclosed a gland packing having a coefficient of friction reduced in use for sealing the water type fluid by utilizing, as an impregnant material for a gland packing, a mixture of polyethylene glycol, a polyacrylic resin or the like to be a hydrophilic resin and a fluororesin particulate, a paraffin wax or the like to be a lubrication holding material.

However, these hydrophilic resins are eluted into water. Therefore, there is a problem in that the hydrophilicity of the gland packing is deteriorated by use for a long period of time.

U.S. Pat. No. 4,256,806 specification has disclosed a technique for forming a yarn itself for the gland packing by a mixture of a fluororesin, graphite and a lubricating oil which act as an impregnant and lubricating material without impregnating the yarn constituted by a fiber material such as asbestos with the impregnant material and the lubricating material. The gland packing formed by braiding the yarn is excellent in flexibility and a lubricating property, and heat generated on the contact surface is quickly diffused by the thermal conductivity of the graphite to an outside so that the seizing is caused with difficulty and a very excellent sealing property can be exhibited.

In use, moreover, an improvement is made in such a manner that the graphite can be prevented from easily flowing out.

In the case in which an abrasion is caused, however, there is a possibility that the graphite might flow out. Therefore, there is a problem in that the gland packing is applied, with difficulty, to uses which do not desire a fluid contamination.

The present invention has been made in order to solve the problems described above, and has an object to provide a gland packing for a rotating and reciprocating apparatus which can maintain an excellent sealing property for a long period of time and can prevent an internal fluid from being contaminated even in the case in which it is used for the shaft seal portion of a water type fluid.

SUMMARY OF THE INVENTION

A gland packing according to the present invention is characterized in that a water swelling mineral is stuck or impregnated into a surface or an inner part of a gland packing base material.

In the present invention, it is preferable that the water swelling mineral should be stuck to at least the surface of the gland packing base material and an amount of sticking should be equal to or larger than 0.01 μg/cm².

In the present invention, it is preferable that the water swelling mineral should be water swelling mica.

According to the present invention, it is possible to easily provide a gland packing for a rotating and reciprocating apparatus which does not cause seizing for a long period of time, can maintain an excellent sealing property and does not contaminate a fluid even in the case in which it is used for the shaft seal portion of a water type fluid.

DETAILED DESCRIPTION OF THE INVENTION

A gland packing according to the present invention will be specifically described below.

<Gland Packing>

In a gland packing according to the present invention, a water swelling mineral is stuck or impregnated into the surface or inner part of a gland packing base material.

Although a portion of the gland packing in which the water swelling mineral is present is varied depending on a method of manufacturing the gland packing with which the water swelling mineral is blended, and is not determined unconditionally, it is present on the surface or inner part of the gland packing base material (that is, the inner part of the base material and the vicinity of the surface of the base material).

If the gland packing according to the present invention to which the water swelling mineral is thus added is used as a seal member (a sealing member) in the rotating and reciprocating portion of a reciprocating apparatus accommodating a water type fluid therein, the fluidity of the surface layer of the gland packing is increased by the thixotropic property of the water swelling mineral when a sliding resistance (a shearing force) is generated between the shaft of the apparatus and the gland packing. As a result, it is possible to cause the seizing with difficulty and to exhibit an excellent sealing property even if the amount of leakage of the internal fluid or a liquid to be added or injected for reducing the sliding resistance or the like is set to be smaller than a conventional amount in the gland packing according to the present invention.

<Water Swelling Mineral>

In the present invention, examples of the water swelling mineral include water swelling mica, smectite, vermiculite, bentonite and the like.

These water swelling minerals can be used singly or in combination with two or more.

In these water swelling minerals, the water swelling mica (synthetic mica) is preferable in that it is possible to enhance a lubricating property in the sliding surface of the gland packing and to improve the heat resistance of the gland packing by making the use of its smoothing property and heat resistance.

In the present invention, it is preferable that the water swelling mica should be scale-shaped and has an average particle size (D50, a measuring method and apparatus: a laser diffraction and scattering method, MT3300EL manufactured by Nikkiso Co., Ltd.) of 2 to 10 µm and a bulk specific gravity (bulk density) of 2 to 3.

The water swelling mica (synthetic mica) is high-purity fluorine type mica which is scale-shaped, and has the same crystal structure as that of natural mica and contains talc as a main raw material, and includes "SOMASIF (ME100)" (manufactured by CO-OP Chemical Co., Ltd., an average particle size of 5 to 7 µm, a true specific gravity of 2.6, a viscosity (measured by a 7% dispersing solution using a Brookfield type viscometer, a 6 rpm value)) of 4000 to 8000 [mPa·s] and 800 to 1600 [mPa·s] (similarly, a 60 rpm value) which is swollen in water and acts as a crystallite dispersing solution having a viscosity.

The water swelling mica is different from ordinary mica in the following respects.

① The water swelling mica has a colloid forming ability and exhibits a thixotropic property when it is dispersed into the water.

② It is possible to form a film by causing a sol to flow into a plate and drying the sol.

In the present invention, in the case in which the gland packing is obtained by sticking the water swelling mineral to the surface of the gland packing base material constituting the gland packing, it is desirable that the water swelling mineral should be stuck to the surface of the base material in an amount of 0.01 µg/cm$^2$ or more, preferably 0.05 µg/cm$^2$ or more because the gland packing hardly causes the seizing and can exhibit an excellent sealing property.

Moreover, in the case in which the gland packing is obtained by adding the water swelling mineral in a process for manufacturing the gland packing in the following manner, for example, in the case in which the gland packing is manufactured by immersing a yarn (a blended yarn) in an impregnating solution in which an impregnant and lubricating material containing the water swelling mineral is molten, dissolved or dispersed, and impregnating the impregnant and lubricating material into the yarn (primary impregnation) and then braiding them to form a braided strand, and further impregnating and sticking (secondary impregnation) the impregnating solution containing the impregnant and lubricating material into the braided strand thus obtained and drying them according to the necessity, it is desirable that the amount of the water swelling mineral contained in the gland packing thus obtained should be usually 5 to 30% by weight, preferably 10 to 15% by weight.

In the case in which the gland packing is manufactured by using a material which does not contain the water swelling mineral in a primary impregnating solution in the manufacturing method but contains the water swelling mineral in only a secondary impregnating solution or the yarn is braided without the execution of the primary impregnation but is subjected to the secondary impregnation, it is desirable that the amount of the water swelling mineral contained in the gland packing thus obtained should be usually 0.1 to 10% by weight, preferably 0.5 to 5% by weight.

Furthermore, in the case in which the yarn is not processed like a string as described but a composition for a gland packing formation having the water swelling mineral blended therewith, and containing an impregnant and lubricating material such as expanded graphite or PTFE and containing a fiber component for a gland packing base material (for a yarn) according to the necessity is directly molded and processed like a ring, a particle or the like so that the gland packing is manufactured, it is desirable that the amount of the water swelling mineral contained in the gland packing thus obtained should be usually 3 to 95% by weight, preferably 5 to 40% by weight.

The gland packing according to the present invention is obtained by braiding a yarn constituted by an organic fiber, a carbon fiber, an inorganic fiber, expanded graphite, a resin film or the like and processing the braided yarn like a string, and furthermore, contains, in the string-shaped braided product, an impregnant and lubricating material such as polytetrafluoroethylene particulates, graphite or a lubricating oil in addition to the water swelling mineral, for example.

Moreover, the gland packing according to the present invention is obtained by putting, in a metal mold or the like, an impregnant and lubricating material such as expanded graphite, PTFE, graphite or a lubricating oil together with the water swelling mineral and molding and processing them to take the shape of a ring or the like. If necessary, a base material fiber or the like may be contained.

The gland packing base material implies a conventional gland packing or the like which does not contain the water swelling mineral and a manufacturing method thereof is not particularly restricted.

In the case in which the gland packing according to the present invention is attached to a rotating and reciprocating apparatus for handling a water type fluid and is thus used, the seizing is hardly caused and an excellent sealing property can be exhibited even if the amount of leakage of an internal fluid or injected fluid for a lubrication on a sliding surface is lessened as compared with a conventional example.

EXAMPLES

While the gland packing and the manufacturing method according to the present invention will be described more specifically based on examples, the invention is not restricted to the examples.

Example 1

A blended yarn [I] (containing 50% by weight of a rock wool and 50% by weight of a meta-type aromatic polyamide fiber) was impregnated with the aqueous dispersion of a PTFE particulate ("POLYFLON D-1" manufactured by DAIKIN INDUSTRIES, LTD.) and dried so that a yarn [I] having 70% by weight of a blended yarn and 30% by weight of a PTFE particulate (100% by weight in total) was obtained.

95 parts by weight of water was added to 5 parts by weight of a water swelling mineral ("SOMASIF (ME100)" manufactured by CO-OP Chemical Co., Ltd.) and they were stirred so that a surface finishing solution [I] was obtained.

The yarn [I] was plaited in an 8-carrier braid so that a string-like braided strand [I] having a thickness of approximately 8 mm □ was obtained.

The braided strand [I] was immersed in the aqueous dispersion of the PTFE particulate ("POLYFLON D-1" manufactured by DAIKIN INDUSTRIES, LTD.) and then dried so that a gland packing base material containing 60% by weight of a blended yarn, 40% by weight of a PTFE particulate (100% by weight in total) and having a bulk density of 1.4 $g/m^3$ was obtained.

The gland packing base material was immersed in the surface finishing solution [I] and then dried so that a gland packing having 0.05 μg/cm² (the amount of sticking: 2.6 μg/m) of the water swelling mineral stuck to the surface was obtained.

The gland packing was cut and was compressed and molded in a metal mold so that a perforated disc-shaped compressed and molded product (a molded product) having an inside diameter of 35 mm, an outside diameter of 51 mm and a height of 8 mm was manufactured.

Four compressed and molded products thus manufactured were attached to the rotating shaft grand portion of a rotating pump (a rotating shaft diameter of 35 mm and a grand portion inside diameter of 51 mm) and was measured a minimum amount of leakage which does not cause a seizing phenomenon when water was pumped through the pump at a rotating speed of 1800 rpm and a discharge pressure of 0.4 MPa. Consequently, the minimum amount of leakage was measured to be 2.0 cc/min.

Results or the like which are obtained are shown together in Table 1.

Example 2

5 parts by weight of a water swelling mineral ("SOMASIF (ME100)" manufactured by CO-OP Chemical Co., Ltd.) was added to 95 parts by weight of the aqueous dispersion of a PTFE particulate ("POLYFLON D-1" manufactured by DAIKIN INDUSTRIES, LTD.) and stirred so that an impregnating solution [I] was obtained.

The braided strand [I] was immersed in an impregnating solution [I] and then dried so that a gland packing containing 59.5% by weight of a blended yarn, 39.3% by weight of a PTFE particulate, 1.2% by weight of a water swelling mineral (100% by weight in total) and having a bulk density of 1.4 $g/m^3$ was obtained.

The gland packing was cut and was compressed and molded in a metal mold so that a perforated disc-shaped compressed and molded product (a molded product) having an inside diameter of 35 mm, an outside diameter of 51 mm and a height of 8 mm was manufactured.

Four compressed and molded products thus manufactured were attached to the rotating shaft grand portion of a rotating pump (a rotating shaft diameter of 35 mm and a grand portion inside diameter of 51 mm) and was measured a minimum amount of leakage which does not cause a seizing phenomenon when water was pumped through the pump at a rotating speed of 1800 rpm and a discharge pressure of 0.4 MPa. Consequently, the minimum amount of leakage was measured to be 2.0 cc/min.

Results or the like which are obtained are shown together in the Table 1.

Example 3

45 parts by weight of liquid paraffin and 5 parts by weight of a water swelling mineral ("SOMASIF (ME100)" manufactured by CO-OP Chemical Co., Ltd.) were added to 50 parts by weight of the aqueous dispersion of a PTFE particulate ("POLYFLON D-1" manufactured by DAIKIN INDUSTRIES, LTD.) and stirred so that an impregnating solution [II] was obtained.

The braided strand [I] was immersed in the impregnating solution [II] and then dried so that a gland packing containing 59.5% by weight of a blended yarn, 31.2% by weight of a PTFE particulate, 8.4% by weight of liquid paraffin, 0.9% by weight of a water swelling mineral (100% by weight in total) and having a bulk density of 1.4 $g/m^3$ was obtained.

The gland packing was cut and was compressed and molded in a metal mold so that a perforated disc-shaped compressed and molded product (a molded product) having an inside diameter of 35 mm, an outside diameter of 51 mm and a height of 8 mm was manufactured.

In the same manner as in the Example 1, the molded product thus obtained was attached to the rotating shaft grand portion of a rotating pump and a minimum amount of leakage which does not cause a seizing phenomenon was measured to be 1.0 cc/min.

Results are shown together in the Table 1.

Comparative Example 1

The braided strand [I] was immersed in the aqueous dispersion of the PTFE particulate ("POLYFLOND-1" manufactured by DAIKIN INDUSTRIES, LTD.) and then dried so that a gland packing containing 59.5% by weight of a blended yarn, 40.5% by weight of a PTFE particulate (100% by weight in total) and having a bulk density of 1.4 $g/m^3$ was obtained.

The gland packing was cut and was compressed and molded in a metal mold so that a perforated disc-shaped compressed and molded product (a molded product) having an inside diameter of 35 mm, an outside diameter of 51 mm and a height of 8 mm was manufactured.

In the same manner as in the Example 1, the molded product thus obtained was attached to the rotating shaft grand portion of a rotating pump and a minimum amount of leakage which does not cause a seizing phenomenon was measured to be 7.5 cc/min.

Results are shown together in the Table 1.

Comparative Example 2

50 parts by weight of liquid paraffin was added to 50 parts by weight of the aqueous dispersion of a PTFE particulate ("POLYFLON D-1" manufactured by DAIKIN INDUSTRIES, LTD.) and stirred so that an impregnating solution [III] was obtained.

The braided strand [I] was immersed in the impregnating solution [III] and then dried so that a gland packing containing 59.5% by weight of a blended yarn, 31.2% by weight of a PTFE particulate and 9.3% by weight of liquid paraffin (100% by weight in total) was obtained.

The gland packing was cut and was compressed and molded in a metal mold so that a perforated disc-shaped compressed and molded product (a molded product) having an inside diameter of 35 mm, an outside diameter of 51 mm and a height of 8 mm was manufactured.

In the same manner as in the Example 1, the molded product thus obtained was attached to the rotating shaft grand portion of a rotating pump and a minimum amount of leakage which does not cause a seizing phenomenon was measured to be 4.0 cc/min.

Results are shown together in the Table 1.

TABLE 1

|  | Minimum Amount of Leakage, cc/min | Condition in Seizing | Condition after Seizing |
| --- | --- | --- | --- |
| Example 1 | 2.0 | Gradual rise in temperature | After the temperature is stabilized, the amount of leakage can be regulated again. |
| Example 2 | 2.0 | | |
| Example 3 | 1.0 | | |
| Comparative Example 1 | 7.5 | Sudden rise in temperature | The amount of leakage cannot be decreased to that before seizing. |
| Comparative Example 2 | 4.0 | | |

As described above in detail, the gland packing according to the present invention has a water swelling mineral stuck or impregnated into the surface or inner part of a gland packing base material, and does not cause seizing for a long period of time, can maintain an excellent sealing property and does not contaminate a fluid even in the case in which the gland packing is used for the shaft seal portion of a water type fluid. Consequently, the gland packing of the present invention can be used suitably for sealing the shaft portion of a rotating and reciprocating apparatus such as a pump constituting various machines and tools and medical instruments.

The invention claimed is:

1. A gland packing wherein a water swelling mineral is stuck or impregnated into a surface or an inner part of a gland packing base material, wherein the water swelling mineral is stuck to at least the surface of the gland packing base material and an amount of sticking is equal to or larger than 0.01 µg/cm$^2$.

2. The gland packing according to claim 1, wherein the water swelling mineral is water swelling mica.

* * * * *